(12) United States Patent
Lee et al.

(10) Patent No.: US 11,363,479 B2
(45) Date of Patent: Jun. 14, 2022

(54) METHOD AND DEVICE FOR PEOPLE COUNTING

(71) Applicant: LG ELECTRONICS INC., Seoul (KR)

(72) Inventors: Yong Suk Lee, Gimpo-si (KR); Yong Seok Seo, Suwon-si (KR); Yoon Kyum Stephen Kim, Seoul (KR); Dong Woo Sohn, Gimpo-si (KR)

(73) Assignee: LG ELECTRONICS INC., Seoul (KR)

( * ) Notice: Subject to any disclaimer, the term of this patent is extended or adjusted under 35 U.S.C. 154(b) by 261 days.

(21) Appl. No.: 16/688,497

(22) Filed: Nov. 19, 2019

(65) Prior Publication Data

US 2020/0092742 A1 Mar. 19, 2020

(30) Foreign Application Priority Data

Aug. 6, 2019 (KR) .......................... 10-2019-0095518

(51) Int. Cl.
| | |
|---|---|
| *H04W 24/10* | (2009.01) |
| *G06N 3/04* | (2006.01) |
| *G06N 3/08* | (2006.01) |
| *H04L 43/10* | (2022.01) |

(52) U.S. Cl.
CPC .............. *H04W 24/10* (2013.01); *G06N 3/04* (2013.01); *G06N 3/08* (2013.01); *H04L 43/10* (2013.01)

(58) Field of Classification Search
CPC ..... H04W 24/10; H04W 4/021; H04W 4/029; G06N 3/04; G06N 3/08; H04L 43/10
See application file for complete search history.

(56) References Cited

U.S. PATENT DOCUMENTS

| | | | |
|---|---|---|---|
| 2020/0074186 A1* | 3/2020 | Cao | ..................... G06K 9/4628 |
| 2020/0286391 A1* | 9/2020 | Beaurepaire | ........... G08G 5/045 |

FOREIGN PATENT DOCUMENTS

| | | |
|---|---|---|
| KR | 10-1480348 B1 | 1/2015 |
| KR | 10-2015-0053158 A | 5/2015 |

\* cited by examiner

*Primary Examiner* — Jamal Javaid
(74) *Attorney, Agent, or Firm* — Birch, Stewart, Kolasch & Birch, LLP

(57) ABSTRACT

Disclosed are a people counting device and a method for counting the number of people capable of executing built-in artificial intelligence (AI) algorithms and/or machine learning algorithms to count the number of people and communicating with user terminals and servers in a 5G communication environment. The method according to an embodiment of the present disclosure can include collecting, by a first collector, probe request packets for a predetermined time from a user terminal transmitting the probe request packets to confirm the existence of an access point, measuring, by a measurer, the density of the probe request packets and generating density data, and estimating, by a estimator, the number of people using a people counting learning model pre-trained to count people according to the density of the probe request packets based on the density data generated by collecting the probe request packets from the user terminal.

18 Claims, 7 Drawing Sheets

FIG.7

| 710 | 720 | 730 | 740 |
|---|---|---|---|
| 9393 | 64454 | 30 | 15 |
| 9524 | 67706 | 30 | 15 |
| 9540 | 69890 | 30 | 15 |
| 3272 | 156624 | 2 | 15 |
| 6093 | 51848 | 48 | 16 |
| 6214 | 53785 | 48 | 16 |
| 6215 | 52390 | 47 | 16 |
| 6337 | 54347 | 47 | 16 |
| 6354 | 55643 | 47 | 16 |
| 6267 | 52955 | 46 | 16 |

METHOD AND DEVICE FOR PEOPLE COUNTING

CROSS-REFERENCE TO RELATED APPLICATION

This present application claims benefit of priority to Korean Patent Application No. 10-2019-0095518, entitled "METHOD AND DEVICE FOR PEOPLE COUNTING" filed on Aug. 6, 2019, in the Korean Intellectual Property Office, the entire disclosure of which is incorporated herein by reference.

BACKGROUND

1. Technical Field

The present disclosure relates to a method and a device for counting the number of people, and more particularly, to a method and a device for counting the number of people which estimates the number of people by collecting and analyzing probe request packets transmitted by a user terminal in order to check a neighboring Wi-Fi access point.

2. Description of Related Art

With the development of information and communication technology, various wireless communication technologies have been developed. Among the technologies, a wireless local area network (WLAN) is a technology that enables a user to access the Internet wirelessly in a home, business, or a specific service providing area by using a terminal based on radio frequency technology.

In a system based on the WLAN technology, when the terminal searches for an access point through an active search method, the terminal transmits probe request packets, and the access point transmits a probe response packet in response to the probe response packet. In an environment in which a plurality of terminals and a plurality of access points exist, each terminal transmits its own probe request packet, and each access point transmits a probe response packet in response to the probe request packet.

In Korean Patent Publication No. 10-2015-0053158 (May 15, 2015), there is disclosed a method and a device for counting people capable of counting people regardless of an environment of an unspecified target area by using a reflection signal of an impulse electro-magnetic wave without using a camera. However, there is not disclosed a technology of estimating the number of terminals to the number of people by collecting and analyzing probe request packets transmitted by the terminal to an access point.

In Korean Patent Registration No. 10-1480348 (Jan. 2, 2015), there is disclosed a device and a method for counting people capable of counting entering and leaving people by using images taken by an image capturing device such as a CCTV. However, there is not disclosed a technology of estimating the number of terminals to the number of people by collecting and analyzing probe request packets transmitted by the terminal to an access point.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An object of the present disclosure is to count the number of terminals and estimate the number of terminal to the number of people by collecting and analyzing probe request packets transmitted by a terminal to an access point.

An object of the present disclosure is to count the number of people by applying machine learning to probe request packets transmitted by a terminal to an access point.

An object of the present disclosure is to count the number of terminals and estimate the number of terminal to the number of people by collecting and analyzing probe request packets transmitted by a terminal to an access point, thereby solving the problems in the related art which cannot count the number of people using the probe request packet while using an optimal process resource.

An object of the present disclosure is to count the number of people by applying artificial intelligence (AI) learning to probe request packets transmitted by a terminal to an access point, thereby solving the problems in the related art which cannot count the number of people using the probe request packet while using an optimal process resource.

An object of the present disclosure is to count the number of terminals and estimate the number of terminal to the number of people by collecting and analyzing probe request packets transmitted by a terminal to an access point so as to be reflected in analysis of a floating population in a specific area and calculation of popularity information.

An aspect of the present disclosure is not limited to the above-mentioned aspects, and other aspects and advantages of the present disclosure, which are not mentioned, will be understood through the following description, and will become apparent from the embodiments of the present disclosure. In addition, it will be appreciated that the aspects and advantages of the present disclosure will be easily realized by those skilled in the art based on the appended claims and a combination thereof.

A method for counting the number of people according to an embodiment of the present disclosure can include estimating the number of people by collecting and analyzing probe request packets from a user terminal transmitting the probe request packets to confirm the existence of an access point.

Specifically, the method for counting the number of people can include collecting, by a first collector, probe request packets for a predetermined time from a user terminal transmitting the probe request packets to confirm the existence of an access point, measuring, by a measurer, the density of the probe request packets and generating density data, and estimating, by an estimator, the number of people using a people counting learning model pre-trained to count people according to the density of the probe request packets based on the density data generated by collecting the probe request packets from the user terminal.

The generating of the density data can include measuring the density of the probe request packets distributed differently according to the number of user terminals and generating the density data.

The generating of the density data can include generating the density data including the number of the probe request packets, an average of intervals between the probe request packets, and a standard deviation of the intervals between the probe request packets.

The generating of the density data can include generating the density data in which the number of probe request packets increases in proportion to the number of user terminals.

The generating of the density data can include generating the density data in which the intervals between the probe request packets decrease in proportion to the number of user terminals.

The generating of the density data can include generating the density data further including a signal strength average value of the probe request packets and a signal strength standard deviation of the probe request packets.

The method for counting the number of people can further include collecting, by a second collector, at least one of start time information on starting the collection of the probe request packets, end time information on ending the collection of the probe request packets, date information on the collection of the probe request packets, weather information on the date collecting the probe request packets, and location information on collecting the probe request packets.

The method for counting the number of people according to an embodiment can further include providing, by a provider, distribution state information of the number of people estimated by the estimator in response to at least one piece of information collected by the second collector.

The providing distribution state information of the number of people estimated by the estimator can include providing by displaying at least one piece of information collected by the second collector and the distribution state information on the number of people estimated by the estimator on a map including the location information collecting the probe request packets.

The estimating of the number of people can be performed using the people counting learning model, and the people counting learning model can be generated by generating a training data set by tagging the number of user terminals as a label in the density data generated from the probe request packets collected for a predetermined time, and learning a deep neural network model using the training data set.

A method for counting the number of people according to another embodiment can include a first collector configured to collect probe request packets for a predetermined time from a user terminal transmitting the probe request packets to confirm the existence of an access point, a measurer configured to measure the density of the probe request packets and generate density data, and an estimator configured to estimate the number of people using a people counting learning model pre-trained to count people according to the density of the probe request packets based on the density data generated by collecting the probe request packets from the user terminal.

The measurer can be configured to measure the density of the probe request packets distributed differently according to the number of user terminals and generate the density data.

The measurer can be configured to generate the density data including the number of the probe request packets, an average of intervals between the probe request packets, and a standard deviation of the intervals between the probe request packets.

The measurer can be configured to generate the density data in which the number of probe request packets increases in proportion to the number of user terminals.

The measurer can be configured to generate the density data in which the intervals between the probe request packets decrease in proportion to the number of user terminals.

The measurer can be configured to generate the density data further including a signal strength average value of the probe request packets and a signal strength standard deviation of the probe request packets.

The people counting device according to an embodiment can further include a second collector configured to collect at least one of start time information on starting the collection of the probe request packets, end time information on ending the collection of the probe request packets, date information on the collection of the probe request packets, weather information on the date collecting the probe request packets, and location information on collecting the probe request packets.

The people counting device according to an embodiment can further include a provider configured to provide distribution state information of the number of people estimated by the estimator in response to at least one piece of information collected by the second collector.

The provider can be configured to provide by displaying at least one piece of information collected by the second collector and the distribution state information on the number of people estimated by the estimator on a map including the location information collecting the probe request packets.

The estimating of the number of people by the estimator can be performed using the people counting learning model, and the people counting learning model can be generated by generating a training data set by tagging the number of user terminals as a label in the density data generated from the probe request packets collected for a predetermined time, and learning a deep neural network model using the training data set.

Other than the aforementioned, there can be further provided other processes and other systems for implementing the present disclosure, and a computer-readable recording medium storing computer programs for implementing such processes.

Advantages and features of the present disclosure and methods of achieving the advantages and features will be more apparent with reference to the following detailed description of example embodiments in connection with the accompanying drawings and claims.

According to the present disclosure, it is possible to count the number of people accurately by collecting and analyzing probe request packets transmitted by a terminal to an access point.

In addition, it is possible to count the number of people accurately by applying artificial intelligence learning to probe request packets transmitted by the terminal to an access point.

It is possible to count the number of terminals and estimate the number of terminal to the number of people by collecting and analyzing probe request packets transmitted by a terminal to an access point so as to be reflected in analysis of a floating population in a specific area and calculation of popularity information.

The above-mentioned embodiments of the present disclosure can be implemented as a computer program executable by various components on a computer, and such the computer program can be recorded in a computer-readable medium.

BRIEF DESCRIPTION OF THE DRAWINGS

The above and other aspects, features, and advantages of the present disclosure will become apparent from the detailed description of the following aspects in conjunction with the accompanying drawings, in which:

FIG. 7 is a diagram illustrating a training data set generated by the people counting unit of FIG. 5;

DETAILED DESCRIPTION

Figure 1:
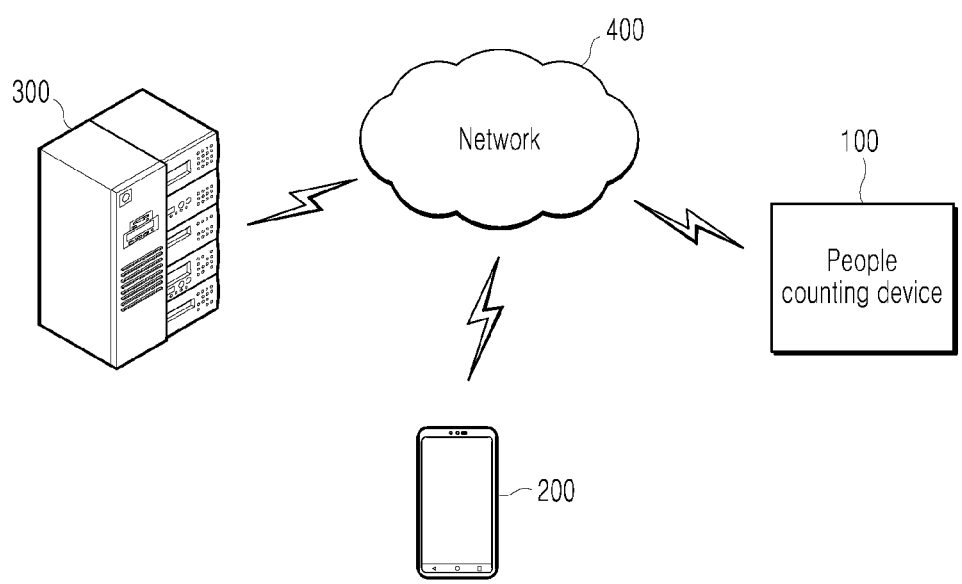
FIG. 1 is a diagram illustrating a people counting environment including a people counting device, a user terminal, a server, and a network connecting the people counting device, the user terminal, and the server to one another.

Advantages and features of the present disclosure and methods for achieving them will become apparent from the descriptions of aspects hereinbelow with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" can be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms can be used herein only to describe various elements, but these elements should not be limited by these terms. Furthermore, these terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a diagram illustrating a people counting environment including a people counting device, a user terminal, a server, and a network connecting the people counting device, the user terminal, and the server to one another.

Referring to FIG. 1, a people counting environment 1 illustrates a state in which a people counting device 100, a user terminal 200, and a server 300 are communicatively connected to one another via a network 400. The people counting device 100 includes a communicator (110 in FIG. 4) that enables to transmit and receive data to and from the user terminal 200 corresponding to a personal communication device and the server 300 via the network 400 which can be wire-based or wireless. In addition, the people counting device 100, the user terminal 200, and the server 300 can be connected to one another in a 5G communication environment.

Figure 2:
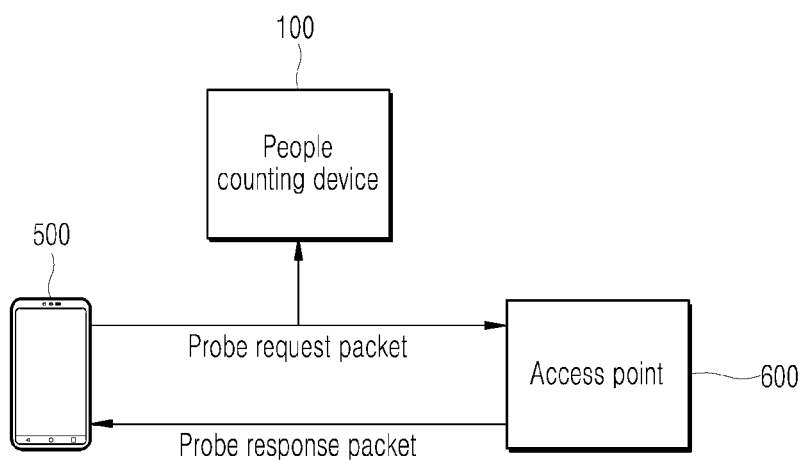
FIG. 2 is a diagram illustrating a collection environment of probe request packets of a people counting device according to an embodiment of the present disclosure.

The people counting device 100 can estimate the number of people by collecting and analyzing probe request packets transmitted by the user terminal 200 or 500 to confirm the existence of an access point (600 in FIG. 2). The people counting device 100 can measure the density of the collected probe request packet and generate density data. The people counting device 100 can estimate the number of people using a people counting learning model pre-trained to count people according to the density of the probe request packet based on the density data generated by collecting the probe request packet from the user terminal 200 or 500.

The user terminal 200 can control an operation of the people counting device 100 through the server 300. Furthermore, the user terminal 200 can receive, from the people counting device 100, various messages regarding the operation of the people counting device 100. These messages can include types of a notification message notifying the start and/or end of people counting of the people counting device 100, a warning message alarming the occurrence of abnormal situations of the people counting device 100, and the like.

The user terminal 200 can include a communication terminal capable of performing functions of a computing device (not illustrated), and can include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Furthermore, the user terminal 200 can be a wearable terminal having a communication function and a data processing function, such as a watch, glasses, a hairband, a ring, or the like. The user terminal 200 is not limited to the aforementioned items, but can use any terminal capable of web-browsing without limitations.

The server 300 can be a database server which provides big data required for applications of various artificial intelligence algorithms, data on the estimation of the number of people, and the like. Furthermore, the server 300 can include a web server or application server that enables remote control of the people counting device 100 by using an application or web browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than only executing rigidly-set static program commands, can be used to take an approach that builds models for deriving predictions and decisions from inputted data.

The server 300 can generate density data from the probe request packet received from the people counting device 100, estimate the number of people using a pre-trained people counting learning model so as to count people according to the density of the probe request packet, and transmit the people estimation result to the people counting device 100.

Depending on a processing capacity of the people counting device 100, at least some of the generation of the density data and the people estimation using the people counting learning model can be performed by the people counting device 100.

The network 400 can serve to connect the people counting device 100 and/or the user terminal 200 and/or the server 300 to one another. The network 400 can include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the scope of the present disclosure is not limited to these examples. Furthermore, the network 400 can transmit/receive information using short-range communications and/or long-distance communications. Examples of the short-range communication technologies can include Bluetooth, radio frequency identification (RFID), infrared data association (IrDA), ultra-wideband (UWB), ZigBee, and wireless fidelity (Wi-Fi). Examples of the long-range communication technologies can include code division multiple access (CDMA), frequency division multiple access (FDMA), time division multiple access (TDMA), orthogonal frequency division multiple access (OFDMA), and single carrier frequency division multiple access (SC-FDMA).

The network 400 can include connection of network elements such as hubs, bridges, routers, switches, and gateways. The network 400 can include one or more connected networks, including a public network such as the Internet, as well as a private network such as a secure corporate private network, for example, a multiple network environment. Access to the network 400 can be provided through one or more wire-based or wireless access networks. Furthermore, the network 400 can support 5G communication and/or an Internet of things (IoT) network for exchanging and processing information between distributed components such as objects.

Figure 3:
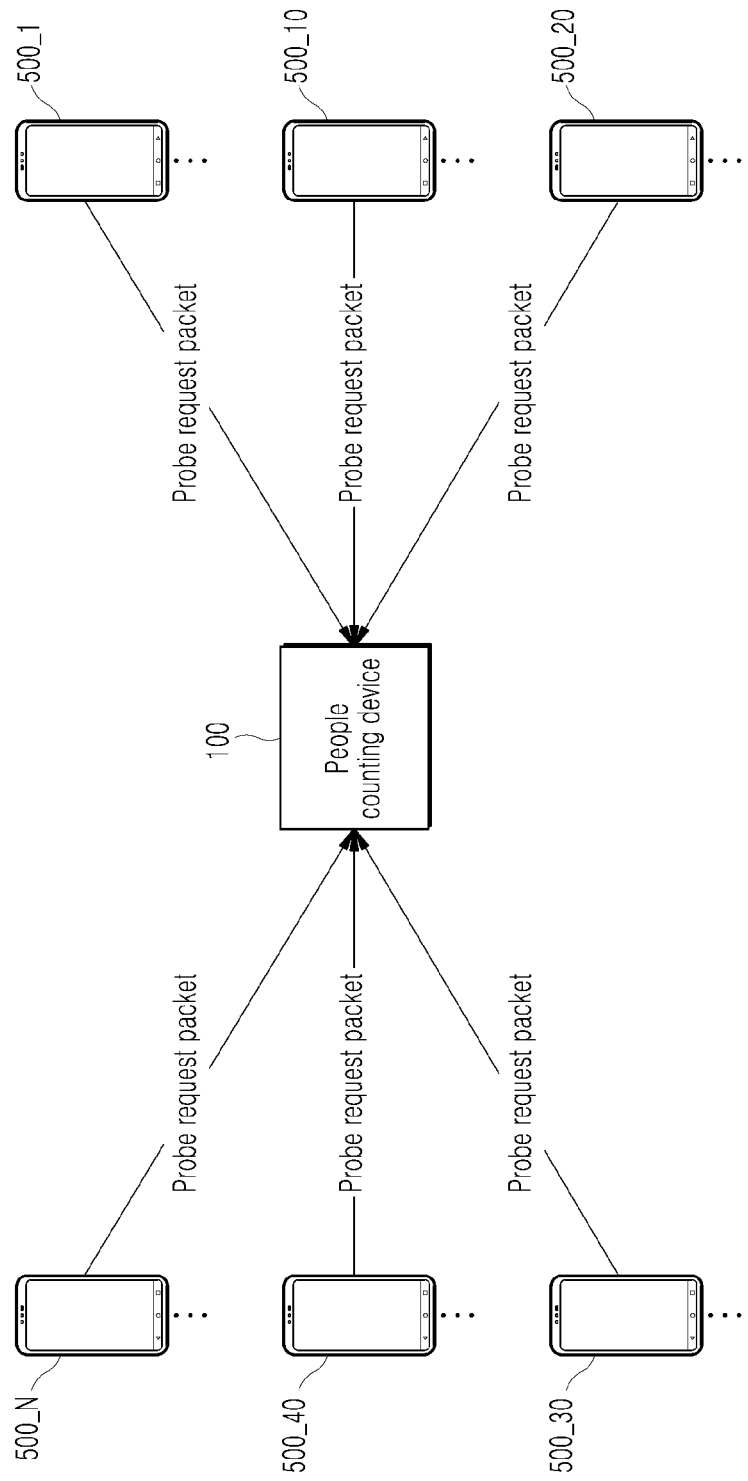
FIG. 3 is a diagram illustrating a collection situation of probe request packets based on a people counting device according to an embodiment of the present disclosure.

FIG. 2 is a diagram illustrating a collection environment of probe request packets of a people counting device according to an embodiment of the present disclosure and FIG. 3 is a diagram illustrating a collection situation of probe request packets based on a people counting device according to an embodiment of the present disclosure. Referring to FIGS. 2 and 3, a people counting device 100 can estimate the number of people by collecting and analyzing probe request packets transmitted to an access point 600 by a plurality of user terminals 500 (500_1 to 500_N). In the present embodiment, the user terminal 200 illustrated in FIG. 1 is a terminal capable of requesting a people counting result to the people counting device 100 and can be included in a user terminal 500 transmitting probe request packets. In addition, at least one of the user terminals 500 (500_1 to 500_N) illustrated in FIG. 2 can be a terminal that can request a people counting result to the people counting device 100.

The user terminal 500 can periodically transmit probe request packets to the access point 600 in order to search for a neighboring access point 600. The access point 600 can receive probe request packets from the user terminal 500 and then transmit a probe response packet to the user terminal 500 in response to the probe request packet to notify the existence of the access point 600.

Here, a probe request signal transmitted from the user terminal 500 to the neighboring access point 600 can include an epoch time, a time synchronization function (TSF) time, a transmission service finish time (TSFT) flag, a data rate, a channel frequency, a physical (PHY) type, a signal strength indicator (SSI) signal, an antenna, a receiver address, a destination address, a source address, a message type, and a supported rate.

Among them, the source address is a MAC address capable of classifying the user terminal 500. For example, if source addresses included in two probe request packets are the same as each other, the source addresses can be classified as the same user terminal 500, and if the source addresses included in the two probe request packets are different from each other, the source addresses can be classified as different user terminals 500. However, for the current privacy protection, the user terminal 500 may not be distinguished by using a method of randomly changing and transmitting a source address value whenever the user terminal 500 transmits the probe request packet. Therefore, when one user terminal 500 transmits probe request packets, for example, ten times, since the source addresses can all be different, it can be difficult for the people counting device 100 to estimate the number of people by separating the user terminal 500 from the source address. Accordingly, in the present embodiment, the artificial intelligence learning is performed by the people counting device 100 that collects the probe request packet transmitted by the user terminal 500 to the access point 600 to count the number of people.

The people counting device 100 can collect probe request packets from the user terminals 500 for a preset time. The people counting device 100 can measure the density of the probe request packets distributed differently according to the number of user terminals 500 and generate density data. The people counting device 100 can estimate the number of people using a people counting learning model pre-trained to count people according to the density of the probe request packet based on the density data generated by collecting the probe request packet from the user terminal 500. Here, the people counting device 100 uses a people counting learning model to estimate the number of people, and the people counting learning model can generate a training data set by tagging the number of user terminals received as labels on the density data generated from the probe request packets collected for the preset time and learn and generate a deep neural network model using the training data set. The people counting learning model can be previously stored in a storage medium (120 of FIG. 4), can be provided from the server 300, or can be newly generated.

In the present embodiment, the user terminal 500 can include a communication terminal capable of performing functions of a computing device (not illustrated), and can include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Furthermore, the user terminal 500 can be a wearable terminal having a communication function and a data processing function, such as a watch, glasses, a hairband, a ring, or the like. The user terminal 500 is not limited to the aforementioned items, but can be any terminal capable of web-browsing without limitations.

Figure 4:
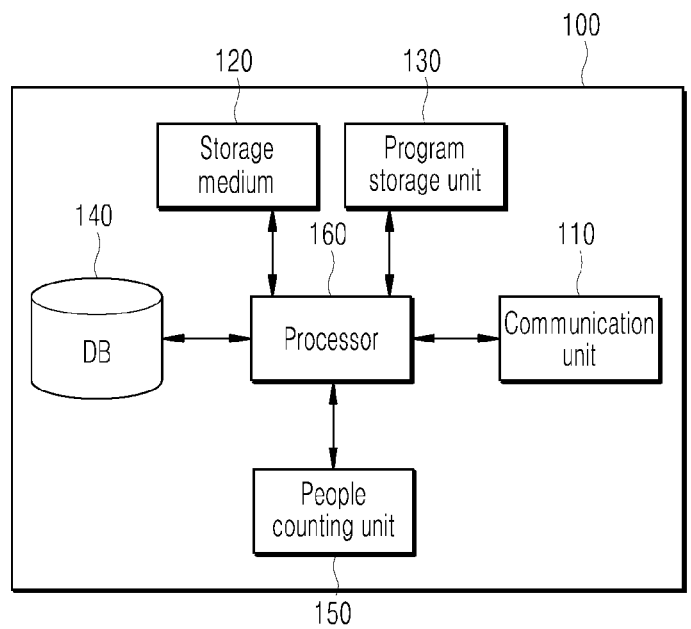
FIG. 4 is a schematic block diagram of a people counting device according to an example embodiment of the present disclosure.

FIG. 4 is a schematic block diagram of a people counting device according to an embodiment of the present disclosure. Descriptions which overlap with the above descriptions related to FIGS. 1 to 3 are not provided below. Referring to FIG. 4, the people counting device 100 includes a communication unit 110, a storage medium 120, a program storage unit 130, a database 140, a people counting unit 150, and a processor 160.

The communication unit 110 can provide a communication interface required for providing a transmission/reception signal with the user terminal 200 or 500 in the form of packet data in association with the network 400 to be described below. In addition, the communication unit 110 can serve to receive a predetermined information request signal from the user terminals 200 and 500, and transmit the information processed by the people counting unit 150 to the user terminals 200 and 500. The communication unit 110 can be a device that includes hardware and software required for transmission/reception of signals such as control signals, data signals, and so forth, with other network devices through wire-based or wireless connections.

The storage medium 120 performs a function of temporarily or permanently storing data processed by the processor 160. Here, the storage medium 120 can include magnetic storage media or flash storage media, but the scope of the present disclosure is not limited thereto. This storage medium 120 can include an internal memory and/or an external memory, and can include a volatile memory such as a DRAM, SRAM, SDRAM, or the like, a non-volatile memory such as a one time programmable ROM (OTPROM), PROM, EPROM, EEPROM, mask ROM, flash ROM, NAND flash memory, NOR flash memory, or the like, and a storage device such as an HDD or a flash drive such as an SSD, compact flash (CF) card, SD card, micro-SD card, mini-SD card, Xd card, a memory stick, or the like.

The program storage unit 130 installs control software which performs collecting probe request packets from the user terminals 200 and 500 for a preset time, generating density data by measuring the density of the collected probe request packets, estimating the number of people using a people counting learning model pre-trained to count people according to the density of the probe request packets based on the density data generated by collecting the probe request packets from the user terminals 200 and 500, collecting at least one of start time information on starting the collection of the probe request packets, end time information on ending the collection of the probe request packets, date information on the collection of the probe request packets, weather information on the date collecting the probe request packets, and location information on collecting the probe request packets, providing distribution state information of the estimated number of people in response to at least one collected information by a user's request, and outputting the at least one collected information and distribution state information on the estimated number of people on a map including the location information on collecting the probe request packets by the user's request.

The database 140 can include a management database that stores information collected, processed, and generated by the people counting device 100.

Accordingly, the management database can store probe request packets, the number of probe request packets, an average of intervals between probe request packets, a standard deviation of the intervals between probe request packets, a signal strength average value of the probe request packet, a signal strength standard deviation of the probe request packet, start time information on starting the collection of the probe request packets, end time information on ending the collection of the probe request packets, date information on the collection of the probe request packets, weather information on the date collecting the probe request packets, location information on collecting the probe request packets, a training data set generated by tagging the number of user terminals 200 and 500 to the density data generated from the probe request packets as labels, and the like. Here, the management database can include one or more setting information for controlling the operation of the people counting device 100, and can include index information for generating people estimation information.

In addition, the database 140 can further include a user database that stores basic information related to a user requesting a people counting result. Here, the basic information related to the user can include basic information about an object such as the object's name, affiliation, personal information, gender, age, contact, e-mail and address, information about authentication (login) such as ID (or e-mail) and password, information about an access country, an access location, and information about a device used to access, information related to access such as an accessed network environment, and the like.

The people counting unit 150 can collect probe request packets from the user terminals 200 and 500 for a preset time. The people counting unit 150 can measure the density of the probe request packets distributed differently according to the number of user terminals 200 and 500 and generate density data. The people counting unit 150 can estimate the number of people using a people counting learning model pre-trained to count people according to the density of the probe request packets based on the density data generated by collecting the probe request packets from the user terminals 200 and 500. Here, the people counting unit 150 uses a people counting learning model to estimate the number of people, and the people counting learning model can generate a training data set by tagging the number of user terminals received as labels on the density data generated from the probe request packets collected for the preset time and learn and generate a deep neural network model using the training data set.

In the present embodiment, the people counting unit 150 can perform learning in connection with the processor 160 or can receive a learning result from the processor 160. In the present embodiment, the people counting unit 150 can be provided outside the processor 160 as illustrated in FIG. 3, or can be provided inside the processor 160 to operate as the processor 160. Hereinafter, the detail of the people counting unit 150 will be described with reference to FIG. 5.

The processor 160 is a kind of central processing unit that drives the control software installed in the program storage unit 130 to control the entire operation of the people counting device 100. Here, the processor 160 can include a device of any kind capable of processing data, such as a processor. Here, the 'processor' can refer to a data processing device built in a hardware, which includes physically structured circuits in order to perform functions represented as a code or command contained in a program. Examples of the data processing device built in a hardware include, but are not limited to, processing devices such as a microprocessor, a central processing unit (CPU), a processor core, a multiprocessor, an application-specific integrated circuit (ASIC), a field programmable gate array (FPGA), and the like.

In the present embodiment, the processor 160 can count the number of people by using the probe request packet collected from the user terminal 200 by using an artificial intelligence technology.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

Also, the AI does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, the machine learning is a technology that investigates and builds systems, and algorithms for such systems, that are capable of learning, making predictions, and enhancing its own performance on the basis of experiential data. Machine learning algorithms, rather than only executing rigidly-set static program commands, can be used to take an approach that builds models for deriving predictions and decisions from inputted data.

Numerous machine learning algorithms have been developed for data classification in machine learning. Representative examples of such machine learning algorithms for data classification can include a decision tree, a Bayesian network, a support vector machine (SVM), an artificial neural network (ANN), and so forth.

The decision tree can include an analysis method that uses a tree-like graph or model of decision rules to perform classification and prediction.

The Bayesian network can include a model that represents the probabilistic relationship (conditional independence) among a set of variables. The Bayesian network can be appropriate for data mining via unsupervised learning.

The SVM can include a supervised learning model for pattern detection and data analysis, heavily used in classification and regression analysis.

The ANN can include a data processing system modeled after the mechanism of biological neurons and interneuron connections, in which a number of neurons, referred to as nodes or processing elements, are interconnected in layers.

The ANNs are models used in machine learning and can include statistical learning algorithms inspired by biological neural networks (particularly of the brain in the central nervous system of an animal) in machine learning and cognitive science.

Specifically, the ANNs can refer generally to models that have artificial neurons (nodes) forming a network through synaptic interconnections, and acquires problem-solving capability as the strengths of synaptic interconnections are adjusted throughout training.

The terms 'artificial neural network' and 'neural network' can be used interchangeably herein.

An ANN can include a number of layers, each including a number of neurons. Furthermore, the ANN can include synapses that connect the neurons to one another.

The ANN can be defined by the following three factors: (1) a connection pattern between neurons on different layers; (2) a learning process that updates synaptic weights; and (3) an activation function generating an output value from a weighted sum of inputs received from a previous layer.

The ANNs can include, but are not limited to, network models such as a deep neural network (DNN), a recurrent neural network (RNN), a bidirectional recurrent deep neural network (BRDNN), a multilayer perception (MLP), and a convolutional neural network (CNN).

The ANN can be classified as a single-layer neural network or a multi-layer neural network, based on the number of layers therein.

In general, the single-layer neural network can include an input layer and an output layer.

In general, the multi-layer neural network can include an input layer, one or more hidden layers, and an output layer.

The input layer is a layer that accepts external data, and the number of neurons in the input layer is the same as the number of input variables, and the hidden layer is located between the input layer and the output layer, and receives signals from the input layer, extracts features, and feeds the extracted features to the output layer. The output layer receives a signal from the hidden layer and outputs an output value based on the received signal. The input signals between the neurons are summed together after being multiplied by corresponding connection strengths (synaptic weights), and if this sum exceeds a threshold value of the corresponding neuron, the neuron can be activated and output an output value obtained through an activation function.

Meanwhile, a deep neural network with a plurality of hidden layers between the input layer and the output layer can be a representative artificial neural network which enables deep learning, which is one machine learning technique.

The ANN can be trained using training data. Here, the learning can refer to the process of determining parameters of the artificial neural network by using the training data, to perform tasks such as classification, regression analysis, and clustering of inputted data. Representative examples of parameters of the artificial neural network can include synaptic weights and biases applied to neurons.

An artificial neural network learned using training data can classify or cluster inputted data according to a pattern within the inputted data.

Throughout the present specification, the artificial neural network learned using training data can be referred to as a trained model.

Hereinbelow, a learning method of the artificial neural network will be described.

The learning method of the artificial neural network can be classified into supervised learning, unsupervised learning, semi-supervised learning, and reinforcement learning.

The supervised learning can include a machine learning method that derives a single function from the training data.

Among the functions that can be thus derived, a function that outputs continuous values can be referred to as regression, and a function that predicts and outputs a class of an input vector can be referred to as classification.

In the supervised learning, an artificial neural network can be learned with training data that has been given with a label.

Here, the label can refer to a correct answer (or a result value) to be guessed by the artificial neural network when the training data is inputted to the artificial neural network.

Throughout the present specification, the correct answer (or the result value) to be guessed by the artificial neural network when the training data is inputted can be referred to as a label or labeling data.

Throughout the present specification, assigning labels to the training data in order to train an artificial neural network can be referred to as labeling the training data with labeling data.

In this case, the training data and labels corresponding to the training data together can form a single training set, and can be inputted to an artificial neural network as a training set.

The training data can exhibit a number of features, and the training data being labeled with the labels can be interpreted as the features exhibited by the training data being labeled with the labels. In this case, the training data can represent a feature of an input object as a vector.

Using training data and labeling data together, the artificial neural network can derive a correlation function between the training data and the labeling data. Then, through evaluation of the function derived from the artificial neural network, a parameter of the artificial neural network can be determined (optimized).

The unsupervised learning is a kind of machine learning method that learns from training data that has not been given with a label.

More specifically, the unsupervised learning can be a learning method that learns an artificial neural network to discover a pattern within given training data and perform classification by using the discovered pattern, rather than by using a correlation between given training data and labels corresponding to the given training data.

Examples of the unsupervised learning can include clustering and independent component analysis.

Examples of the artificial neural network using the unsupervised learning can include a generative adversarial network (GAN) and an autoencoder (AE).

The GAN can include a machine learning method in which two different artificial intelligences, a generator and a discriminator, improve performance through competing with each other.

The generator can be a model creating new data that generate new data based on true data.

The discriminator can be a model recognizing patterns in data that determines whether inputted data is from the true data or from the new data generated by the generator.

Furthermore, the generator can receive and learn data that has failed to fool the discriminator, while the discriminator can receive and learn data that has succeeded in fooling the discriminator. Accordingly, the generator can evolve so as to fool the discriminator as effectively as possible, while the discriminator can evolve so as to distinguish, as effectively as possible, between the true data and the data generated by the generator.

An auto-encoder (AE) can include a neural network which aims to reconstruct its input as output.

The AE can include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer can be inputted to the output layer. In this case, since the number of nodes in the output layer is greater than the number of nodes in the hidden layer, the dimensionality of the data increases, thus data decompression or decoding can be performed.

Furthermore, in the AE, the inputted data can be represented as hidden layer data as interneuron connection strengths are adjusted through learning. The fact that when representing information, the hidden layer is able to reconstruct the inputted data as output by using fewer neurons than the input layer can indicate that the hidden layer has discovered a hidden pattern in the inputted data.

The semi-supervised learning can indicate a learning method using both labeled training data and unlabeled training data.

One semi-supervised learning technique involves reasoning the label of unlabeled training data, and then using this reasoned label for learning. This technique can be used advantageously when the cost associated with the labeling process is high.

Reinforcement learning can be based on a theory that given the condition under which a reinforcement learning agent can determine what action to choose at each time instance, the agent can find an optimal path based on experience without reference to data.

The reinforcement learning can be performed primarily by a Markov decision process (MDP).

The Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network can be determined by a number of factors, including the number of hidden layers, the number of hidden nodes included in each hidden layer, input feature vectors, target feature vectors, and so forth.

The hyperparameters can include various parameters which need to be initially set for learning, much like the initial values of model parameters. Also, the model parameters can include various parameters sought to be determined through learning.

For instance, the hyperparameters can include initial values of weights and biases between nodes, mini-batch size, iteration number, learning rate, and so forth. Furthermore, the model parameters can include a weight between nodes, a bias between nodes, and so forth.

The loss function can be used as an index (reference) in determining an optimal model parameter during the learning process of an artificial neural network. Learning in the artificial neural network involves a process of adjusting model parameters so as to reduce the loss function, and the purpose of learning can be to determine the model parameters that minimize the loss function.

The loss functions typically use means squared error (MSE) or cross entropy error (CEE), but the present disclosure is not limited thereto.

A cross-entropy error can be used when a true label is one-hot encoded. The one-hot encoding can include an encoding method in which among given neurons, only those corresponding to a target answer are given 1 as a true label value, while those neurons that do not correspond to the target answer are given 0 as a true label value.

In machine learning or deep learning, learning optimization algorithms can be used to minimize a cost function, and examples of such learning optimization algorithms can include gradient descent (GD), stochastic gradient descent (SGD), momentum, Nesterov accelerate gradient (NAG), Adagrad, AdaDelta, RMSProp, Adam, and Nadam.

The GD includes a method that adjusts model parameters in a direction that decreases the output of a cost function by using a current slope of the cost function.

The direction in which the model parameters are to be adjusted can be referred to as a step direction, and a size to be adjusted can be referred to as a step size.

Here, the step size can mean a learning rate.

The GD obtains a slope of the cost function through use of partial differential equations, using each of model parameters, and updates the model parameters by adjusting the model parameters by a learning rate in the direction of the slope.

The SGD can include a method that separates the training dataset into mini batches, and by performing gradient descent for each of these mini batches, increases the frequency of gradient descent.

Adagrad, AdaDelta and RMSProp can include methods that increase optimization accuracy in SGD by adjusting the step size. In the SGD, the momentum and NAG can also include methods that increase optimization accuracy by adjusting the step direction. Adam can include a method that combines momentum and RMSProp and increases optimization accuracy in SGD by adjusting the step size and step direction. Nadam can include a method that combines NAG and RMSProp and increases optimization accuracy by adjusting the step size and step direction.

Learning rate and accuracy of an artificial neural network can include not only the structure and learning optimization algorithms of the artificial neural network but also the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Figure 5:
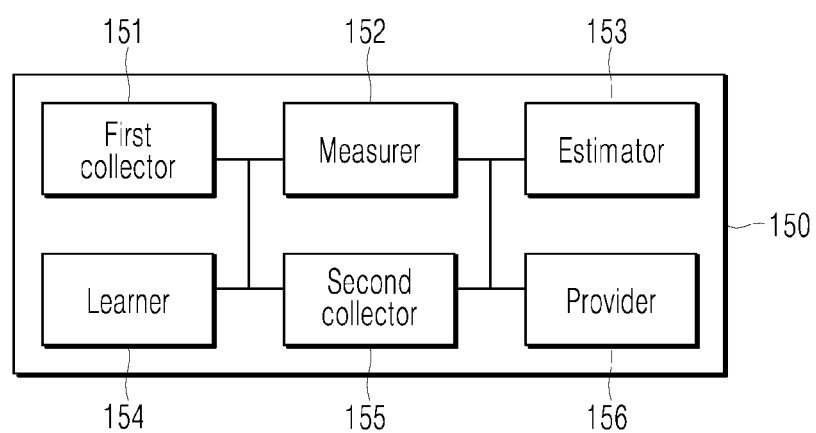
FIG. 5 is a schematic block diagram of a people counting unit of the people counting device of FIG. 4.
Figure 6:
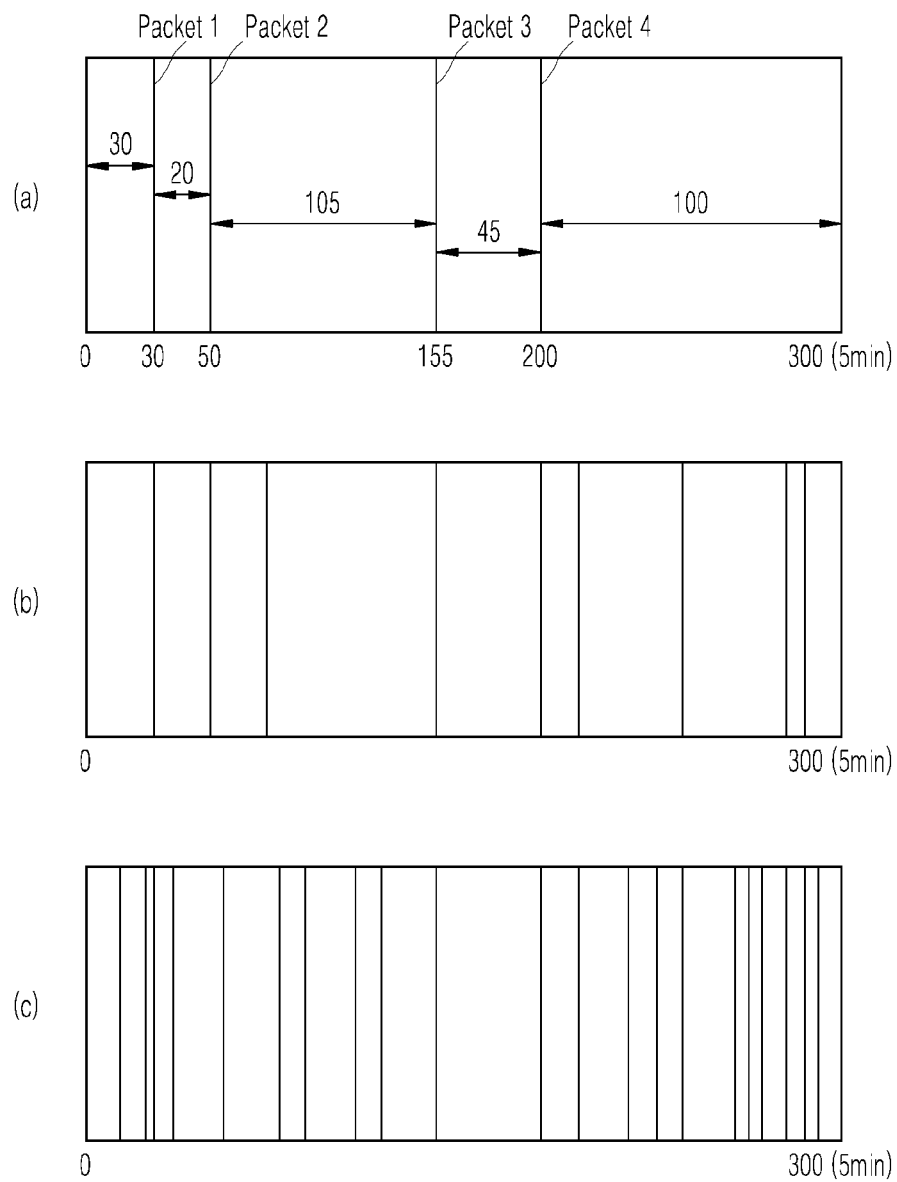
FIG. 6 is a diagram for describing generation of density data from the probe request packet collected by the people counting unit of FIG. 5.

FIG. 5 is a schematic block diagram of a people counting unit of the people counting device of FIG. 4, FIG. 6 is a diagram for describing generation of density data from the probe request packet collected by the people counting unit of FIG. 5, and FIG. 7 is a diagram illustrating a training data set generated by the people counting unit of FIG. 5. Descriptions which overlap with the above descriptions related to FIGS. 1 to 4 are not provided below. Referring to FIGS. 5 to 7, the people counting unit 150 can include a first collector 151, a measurer 152, an estimator 153, a learner 154, a second collector 155, and a provider 156. Any one or more components of the people counting unit 150 and/or the people counting device 100 can be implemented using at least one processor, sub-processor, application, software, etc.

The first collector 151 can collect probe request packets from a plurality of user terminals 200 for a preset time (for example, five minutes).

The measurer 152 can measure the density of probe request packets distributed differently according to the number of user terminals 200 by using probe request packets collected by the first collector 151 and generate density data. The density data generated by the measurer 152 can include the number of collected probe request packets, an average of intervals between probe request packets, and a standard deviation of the intervals between probe request packets.

FIG. 6 is a diagram for describing generation of density data from the probe request packets by the measurer 152 included in the people counting unit 150. FIG. 6A illustrates density data generated by collecting probe request packets for 5 minutes from one user terminal 500, FIG. 6B illustrates density data generated by collecting probe request packets from two user terminals 500 for 5 minutes, and FIG. 6C illustrates density data generated by collecting probe request packets from five user terminals 500 for 5 minutes.

Referring to FIG. 6A, in the density data generated by collecting probe request packets from one user terminal 500, it can be seen that four packets (packets 1 to 4) exist, intervals between the four packets are 30 seconds, 20 seconds, 105 seconds, 45 seconds, and 100 seconds, an average of the intervals between the packets is 60,000 msec, and the standard deviation of intervals between the packets is 39,843 msec.

On the other hand, since the user terminal 500 is provided by the user, the counting number of user terminals 500 and the number of counting results of the user can be the same as each other. From FIGS. 6A to 6C, it can be seen that as the number of people increases, the density data generated by the measurer 152 increases the number of packets and the interval between packets becomes narrower. That is, the number of probe request packets increases in proportion to the number of user terminals 500, and the interval between probe request packets decreases in proportion to the number of user terminals 500.

In the present embodiment, the density data can include a small or large number of packets included in the probe request packet as illustrated in FIGS. 6A to 6C. Since the density data becomes more complicated as the number of user terminals 500 increases, it is possible to learn how many user terminals 500 exist when arbitrary density data is generated and estimate the number of user terminals.

In the present embodiment, the density data generated by the measurer 152 can further include a signal strength average and a standard deviation of the probe request packets, in addition to the number of probe request packets, an average of intervals between probe request packets, and the standard deviation of the intervals between probe request packets described above. If the signal strength average and the standard deviation of the probe request packets are further added to the density data, more accurate people counting results can be generated.

The estimator 153 can estimate the number of people using a people counting learning model pre-trained to count people according to the density of the probe request packets based on the density data generated by collecting the probe request packets from the user terminal 500.

The learner 154 can generate a people counting learning model for estimating the number of people of the estimator 153. The learner 154 can generate a training data set by tagging the number of user terminals as a label in the density data generated from the probe request packets collected for a predetermined time, and then generate a people counting learning model by learning a deep neural network model using the training data set. Here, the people counting learning model can be generated by using a random forest (RF), a support vector machine (SVM), and a deep neural network using a machine learning technique.

FIG. 7 illustrates a training data set generated by using the density data generated by the measurer 152 included in the people counting unit 150. Referring to FIG. 7, 710 can represent an average interval (msec) between packets, 720 can represent a standard deviation (msec) of intervals between packets, 730 can represent the number of packets, and 740 can represent the number of user terminals 500.

In the embodiment, the estimation result of the number of people estimated by the estimator 153 can be the same as the people counting result, and the people counting result can be stored in the storage medium 120 or the database 140.

The second collector 155 can collect at least one of start time information on starting the collection of the probe request packets, end time information on ending the collection of the probe request packets, date information on the collection of the probe request packets, weather information on the date collecting the probe request packets, location information on collecting the probe request packets, and map information including locations collecting the probe request packets.

The provider 156 can provide distribution state information on the number of people estimated by the estimator 153 to the user terminal 200 in response to at least one piece of information collected by the second collector 155 at the request of a user having the user terminal 200.

Here, the provider 156 can display and provide at least one piece of information collected by the second collector 155 and the distribution state information on the number of people estimated by the estimator 153 on a map including the location information collecting the probe request packets. The form of the information provided by the provider 156 to the user terminal 200 can be various, such as an image, a chart, a graph, a combination thereof, and the like. The user terminal 200 receiving the people counting results can be reflected in the analysis of the floating population and calculation of popularity information of a specific region.

Figure 8:
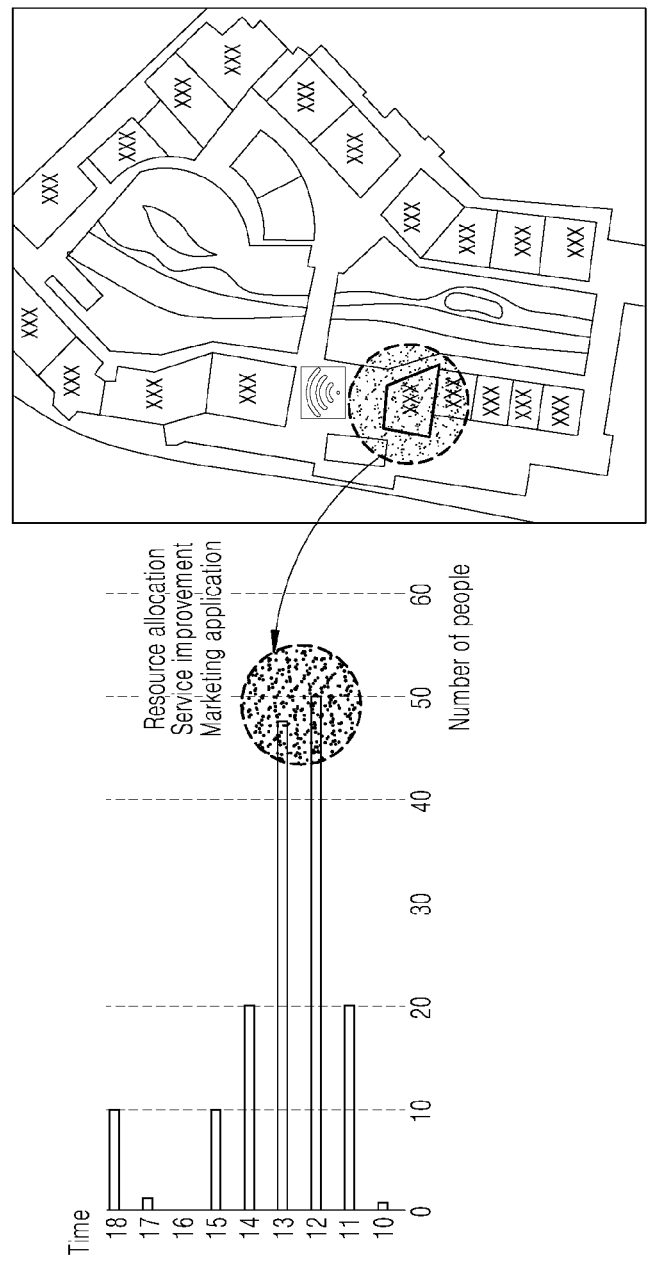
FIG. 8 is a diagram illustrating a people distribution state information provided by a people counting device according to an embodiment of the present disclosure.

FIG. 8 is a diagram illustrating people distribution state information provided by the people counting device according to an embodiment of the present disclosure. As the information generated by the provider 156 to provide to the user terminal 200 in response to a request of the user terminal 200, at least one piece of information (for example, time interval information) collected by the second collector 155 and a counting result of the number of people estimated by the estimator 153 are illustrated on a map including location information from which probe request packets is collected.

In the present embodiment, the user terminal 200 can include a people counting device 100. There are a variety of methods to include a conversation people counting device 100 in the user terminal 200. As a specific embodiment, the people counting device 100 can be installed in the user terminal 200 via a communication network, and for example, the people counting device 100 can be installed as one application (e.g., a people counting application) in the user terminal 200. As another specific embodiment, the people counting device 100 can be installed in the user terminal 200 through offline. However, this is an exemplary form, and the present disclosure is not limited thereto, and can include a case in which the people counting device 100 can be installed in various forms in the user terminal 200.

In the present embodiment, the user terminal 200 including the people counting device 100 executes the people counting application and collects, for a predetermined time, probe request packets transmitted to the access point by a user terminal different from itself (hereinafter, referred to as the user terminal 200). The user terminal 200 can measure the density of the probe request packet and generate density data, and generate a training data set in which the number of the user terminals 200 is mapped to the density data. The user terminal 200 generates a people counting algorithm by learning a user terminal counting algorithm by inputting the training data set, and then collects probe request packets from the user terminal 200 to generate density data, and executes the people counting algorithm to estimate the number of people including the user terminal 200.

As an alternative embodiment, a part 100A of the people counting device 100 can be included in the user terminal 200, and the other part 100B can be connected to the user terminal 200 through the network 400.

For example, the part 100A including the first collector 151, the measurer 152, the second collector 155, and the provider 156 among the members of the people counting device 100 for the conversation contents illustrated in FIGS. 1 to 5 can be included in the user terminal 200. Since a method of allowing the part 100A of the people counting device 100 to be included in the user terminal 200 is the same as the above description, a detailed description thereof will be omitted. In addition, among the members of the people counting device 100 illustrated in FIGS. 1 to 5, the other part 100B including the estimator 153 and the learner 154 can be connected with the user terminal 200 via the network 400.

In the present embodiment, although it is described when the estimator 153 and the learner 154 of the members of the people counting device 100 are connected to the user terminal 200 and the network 400 as a part 100B, this is one embodiment and the present disclosure is not limited thereto. That is, at least one of the plurality of members included in the people counting device 100 can be selectively connected to the user terminal 200 by the network 400.

Figure 9:
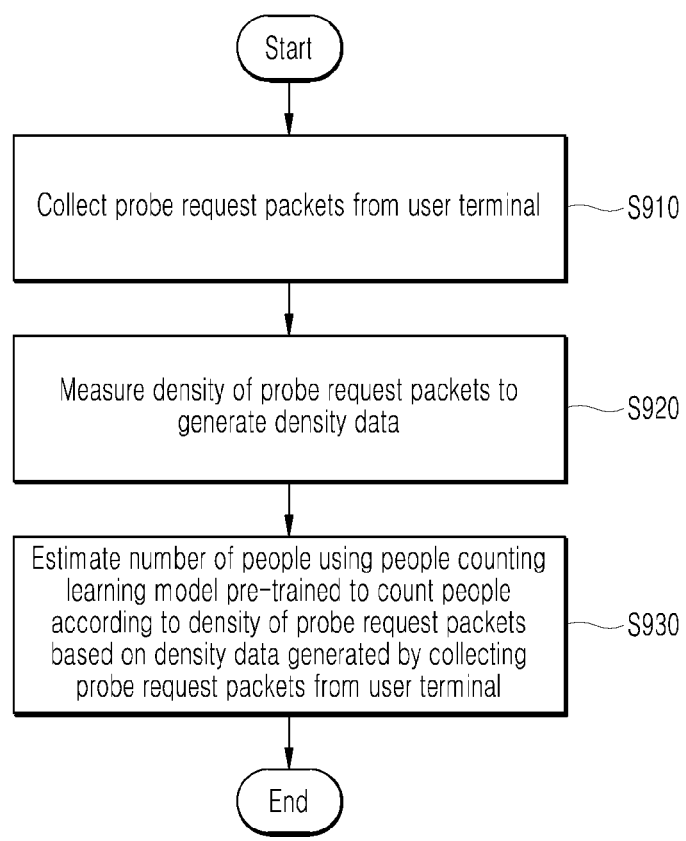
FIG. 9 is a flowchart for describing a method for counting the number of people according to an example embodiment of the present disclosure.

FIG. 9 is a flowchart for describing a method for counting the number of people according to an example embodiment of the present disclosure. Descriptions which overlap with the above descriptions related to FIGS. 1 to 8 are not provided below.

Referring to FIG. 9, in step S910, a people counting device 100 collects probe request packets periodically transmitted from user terminals 200 and 500 to search for a neighboring access point.

In step S920, the people counting device 100 measures the density of the probe request packets distributed differently according to the number of user terminal 200 using the collected probe request packets and generates density data (the number of collected probe request packets, an average of intervals between the probe request packets, and a standard deviation of the intervals between the probe request packets, and a signal strength average and a standard deviation of the probe request packets).

In step S930, the people counting device 100 can estimate the number of people using a people counting learning model pre-trained to count people according to the density of the probe request packet based on the density data generated by collecting the probe request packet from the user terminals 200 and 500.

Here, the people counting learning model can be generated by generating a training data set by tagging the number of user terminals as a label in the density data generated from the probe request packets collected for a predetermined time, and learning a deep neural network model using the training data set.

As an alternative embodiment, the people counting device 100 can collect at least one of start time information on starting the collection of the probe request packets, end time information on ending the collection of the probe request packets, date information on the collection of the probe request packets, weather information on the date collecting the probe request packets, location information on collecting the probe request packets, and map information including locations collecting the probe request packets. The people counting device 100 can provide distribution state (people counting result) information on the number of people estimated by the estimator 153 to the user terminal 200 in response to at least one piece of information collected by the second collector 155 at the request of a user having the user terminal 200. Specifically, the people counting device 100 can display and provide at least one collected information and the distribution state (people counting result) information on the number of people estimated on a map including the location information collecting the probe request packets. The user terminal 200 receiving the people counting results can be reflected in the analysis of the floating population and calculation of popularity information of a specific region.

The example embodiments described above can be implemented through computer programs executable through various components on a computer, and such computer programs can be recorded in computer-readable media. Here, the medium can include magnetic media such as hard discs, floppy discs, and magnetic tapes, optical media such as CD-ROM and DVD, magneto-optical media such as floptical disc, and hardware devices specially configured to store and perform program codes, such as ROM, RAM, and flash memory.

The computer programs can be those specially designed and constructed for the purposes of the present disclosure or they can be of the kind well known and available to those skilled in the computer software arts. Examples of the computer program can include not only machine language codes generated by compilers but also high-level language codes that can be executed by computers using interpreters.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps can be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications can be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A method of counting the number of people, the method performed by at least one processor of a device and comprising:
   collecting probe request packets for a predetermined time from a user terminal transmitting the probe request packets to confirm the existence of an access point;
   measuring a density of the probe request packets and generating density data based on the measured density; and
   estimating the number of people using a people counting learning model pre-trained to count people according to the density of the probe request packets based on the density data generated by collecting the probe request packets from the user terminal,
   wherein the generating of the density data includes measuring the density of the probe request packets distributed differently according to the number of user terminals and generating the density data based on the measured density.

2. A method of counting the number of people, the method performed by at least one processor of a device and comprising:
   collecting probe request packets for a predetermined time from a user terminal transmitting the probe request packets to confirm the existence of an access point;
   measuring a density of the probe request packets and generating density data based on the measured density; and
   estimating the number of people using a people counting learning model pre-trained to count people according to the density of the probe request packets based on the density data generated by collecting the probe request packets from the user terminal,
   wherein the generating of the density data includes generating the density data including the number of the probe request packets, an average of intervals between the probe request packets, and a standard deviation of the intervals between the probe request packets.

3. The method of claim 2, wherein the generating of the density data includes generating the density data in which the number of the probe request packets increases in proportion to the number of the user terminals.

4. The method of claim 2, wherein the generating of the density data includes generating the density data in which the intervals between the probe request packets decrease in proportion to the number of user terminals.

5. The method of claim 2, wherein the generating of the density data includes generating the density data further including a signal strength average value of the probe request packets and a signal strength standard deviation of the probe request packets.

6. The method of claim 1, further comprising:
   collecting information including at least one of start time information on starting the collection of the probe request packets, end time information on ending the collection of the probe request packets, date information on the collection of the probe request packets, weather information on the date collecting the probe request packets, and location information on collecting the probe request packets.

7. The method of claim 6, further comprising:
providing information on a distribution state of the number of people estimated using the people counting learning model in response to at least one piece of the collected information.

8. The method of claim 7, wherein the providing of the information on the distribution state information of the number of people includes displaying the at least one piece of the collected information and the information on the distribution state of the number of people estimated using the people counting learning model on a map including the location information on collecting the probe request packets.

9. The method of claim 1, wherein the people counting learning model is generated by generating a training data set by tagging the number of user terminals as a label in the density data generated from the probe request packets collected for a predetermined time, and learning a deep neural network model using the training data set.

10. A device for counting the number of people, the device comprising:
at least one processor configured to:
collect probe request packets for a predetermined time from a user terminal transmitting the probe request packets to confirm the existence of an access point;
measure a density of the probe request packets and generate density data based on the measured density; and
estimate the number of people using a people counting learning model pre-trained to count people according to the density of the probe request packets based on the density data generated by collecting the probe request packets from the user terminal,
wherein the processor is further configured to measure the density of the probe request packets distributed differently according to the number of user terminals and generate the density data based on the measured density.

11. The device of claim 10, wherein the processor is further configured to generate the density data including the number of the probe request packets, an average of intervals between the probe request packets, and a standard deviation of the intervals between the probe request packets.

12. The device of claim 11, wherein the processor is further configured to generate the density data in which the number of the probe request packets increases in proportion to the number of user terminals.

13. The device of claim 11, wherein the processor is further configured to generate the density data in which the intervals between the probe request packets decrease in proportion to the number of user terminals.

14. The device of claim 11, wherein the processor is further configured to generate the density data further including a signal strength average value of the probe request packets and a signal strength standard deviation of the probe request packets.

15. The device of claim 10, wherein the processor is further configured to collect information including at least one of start time information on starting the collection of the probe request packets, end time information on ending the collection of the probe request packets, date information on the collection of the probe request packets, weather information on the date collecting the probe request packets, and location information on collecting the probe request packets.

16. The device of claim 15, wherein the processor is further configured to provide information on a distribution state of the number of people estimated using the people counting learning model in response to at least one piece of the collected information.

17. The device of claim 16, wherein the processor is further configured to display the at least one piece of the collected information and the information on the distribution state of the number of people on a map including the location information on collecting the probe request packets.

18. The device of claim 10, wherein the people counting learning model is generated by generating a training data set by tagging the number of user terminals as a label in the density data generated from the probe request packets collected for a predetermined time, and learning a deep neural network model using the training data set.

* * * * *